(12) United States Patent
Nonoyama et al.

(10) Patent No.: US 11,489,171 B2
(45) Date of Patent: Nov. 1, 2022

(54) FUEL CELL SEPARATOR AND MANUFACTURING METHOD FOR MANUFACTURING FUEL CELL SEPARATOR

(71) Applicant: TOYOTA JIDOSHA KABUSHIKI KAISHA, Toyota (JP)

(72) Inventors: Nobuaki Nonoyama, Chiryu (JP); Tomoko Kozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/302,778

(22) Filed: May 12, 2021

(65) Prior Publication Data

US 2022/0045340 A1 Feb. 10, 2022

(30) Foreign Application Priority Data

Aug. 5, 2020 (JP) .............................. JP2020-133312

(51) Int. Cl.

| *H01M 8/0243* | (2016.01) |
|---|---|
| *H01M 8/0234* | (2016.01) |
| *H01M 8/0239* | (2016.01) |
| *H01M 8/0258* | (2016.01) |

(52) U.S. Cl.
CPC ....... *H01M 8/0243* (2013.01); *H01M 8/0234* (2013.01); *H01M 8/0239* (2013.01); *H01M 8/0258* (2013.01)

(58) Field of Classification Search
CPC ............. H01M 8/0243; H01M 8/0234; H01M 8/0239; H01M 8/0258; H01M 8/0228; H01M 8/0254; H01M 8/0213; H01M 8/0226; H01M 8/0221; Y02E 60/50; Y02P 70/50; B29C 70/46
See application file for complete search history.

(56) References Cited

FOREIGN PATENT DOCUMENTS

| JP | 2008091097 A | 4/2008 |
|---|---|---|
| JP | 2016081901 A | 5/2016 |
| WO | 2008/038835 A1 | 4/2008 |

*Primary Examiner* — Helen Oi K Conley
(74) *Attorney, Agent, or Firm* — Hunton Andrews Kurth LLP (57) ABSTRACT

This disclosure provides a manufacturing method for manufacturing a fuel cell separator. The manufacturing method includes: providing a material sheet including a fiber sheet, carbon particles, and a resin, the carbon particles and the resin being applied to the fiber sheet; and pressing the material sheet into a recess-projection shape by which a gas circulation passage is to be formed, and forming a top portion and a shift portion. In the pressing of the material sheet, the material sheet is pressed such that a draft of the top portion is higher than a draft of the shift portion.

5 Claims, 6 Drawing Sheets

RELATED ART

FIG. 4B

RELATED ART

FUEL CELL SEPARATOR AND MANUFACTURING METHOD FOR MANUFACTURING FUEL CELL SEPARATOR

CROSS-REFERENCE TO RELATED APPLICATION

This application claims priority to Japanese Patent Application No. 2020-133312 filed on Aug. 5, 2020, incorporated herein by reference in its entirety.

BACKGROUND

1. Technical Field

This disclosure relates to a fuel cell separator and a manufacturing method for the fuel cell separator. This disclosure particularly relates to a carbon-material based fuel cell separator and a manufacturing method thereof.

2. Description of Related Art

As one of the measures to environmental problems and so on, fuel cells attract attention. The fuel cells generate electric power by an electrochemical reaction between fuel gas and oxidation gas.

At the time of power generation, hydrogen gas is supplied to an anode side as fuel gas (anode gas), so that reaction to produce hydrogen ions and electrons from the hydrogen gas is caused. The hydrogen ions move to a cathode side through an electrolyte, and the electrons reach the cathode through a circuit outside a fuel cell. In the meantime, oxygen gas or air is supplied to the cathode side as oxidation gas (cathode gas), so that reaction in which oxygen is reacted with the hydrogen ions and the electrons to produce water (water vapor) is caused.

Generally, the fuel cells achieve high-output power generation by laminating a plurality of single cells each configured to generate electric power as described above. A separator by which the single cells are separated from each other includes passages via which fuel gas and oxidation gas necessary for power generation are supplied and generated water (water vapor) is discharged. The separator requires a high gas-impermeability that achieves complete separation between the aforementioned supply gases (the fuel gas and the oxidation gas) and the discharge gas (water vapor) and a high conductivity to reduce an internal resistance of the fuel cells.

Fuel cell separators that satisfy the above requirement are roughly classified into a metallic-material based separator and a carbon-material based separator.

A metallic material has a large specific gravity but has an excellent strength and a high conductivity. Accordingly, the metallic-material based separator is thin and is excellent in conductivity. However, in order to maintain corrosion resistance, the metallic-material based separator has problems, e.g., that selectable materials are limited or that a surface treatment is required.

In the meantime, a carbon material has a small specific gravity and a high conductivity and is excellent in corrosion resistance. On this account, various carbon-material based separators have been examined. For example, Japanese Unexamined Patent Application Publication No. 2016-81901 (JP 2016-81901 A) describes a fuel cell separator provided with a recessed portion for gas circulation on at least one surface. The recessed portion is formed by performing heat pressing on a nonwoven fabric containing matrix resin and carbon fiber. Japanese Unexamined Patent Application Publication No. 2008-91097 (JP 2008-91097 A) describes a fuel cell separator containing a carbon material and thermoplastic resin and provided with a gas circulation passage formed by recess-projection forming processing. Further, JP 2008-91097 A also describes that the carbon material contained in the fuel cell separator includes carbon fibers having a diameter of 200 nm or less, and a top portion of a recess-projection shape is thinner than the other parts.

SUMMARY

The carbon-material based separator contains resin for securing strength. Since the resin inhibits conductivity, the inventors of the present disclosure found such a problem that the carbon-material based separator in the related art was desired to be further improved in conductivity.

This disclosure has been accomplished in order to solve the above problem. That is, an object of this disclosure is to provide a carbon-material based fuel cell separator improved in conductivity more than before and a manufacturing method thereof.

In order to achieve the above object, the inventors of this disclosure have accomplished a fuel cell separator and a manufacturing method thereof according to this disclosure as a result of diligent study. The fuel cell separator and the manufacturing method thereof according to this disclosure include the following aspects.

<1> A manufacturing method for manufacturing a fuel cell separator includes: providing a material sheet including a fiber sheet, carbon particles, and resin, the carbon particles and the resin being applied to the fiber sheet; and pressing the material sheet into a recess-projection shape by which a gas circulation passage is to be formed, and forming a top portion and a shift portion. In the pressing of the material sheet, the material sheet is pressed such that a draft of the top portion is higher than a draft of the shift portion.

<2> In the manufacturing method described in <1>, the draft of the top portion may be 1.2 to 2.0 times of the draft of the shift portion.

<3> In the manufacturing method described in <1> or <2>, the fiber sheet may include at least either of carbon fibers and resin fibers each having a fiber diameter of 1 μm to 100 μm and a fiber length of 1 mm to 30 mm.

<4> In the manufacturing method described in any one of <1> to <3>, the material sheet may be provided by impregnating the fiber sheet with the carbon particles and thermosetting resin.

<5> In the manufacturing method described in any one of <1> to <4>, the material sheet may be provided by sandwiching the fiber sheet impregnated with the carbon particles between thermoplastic resin sheets containing carbon particles such that opposite surfaces of the fiber sheet are covered with the thermoplastic resin sheets.

<6> A fuel cell separator includes: a fiber sheet; and carbon particles and resin dispersed in the fiber sheet. The fuel cell separator has a recess-projection shape by which a gas circulation passage is to be formed. The thickness of top portions of the recess-projection shape on opposite surfaces of the fuel cell separator is thinner than a thickness of at least part of a shift portion between the top portions. The area content ratio of the carbon particles is higher in at least part of the top portions than in the at least part of the shift portion.

<7> In the fuel cell separator described in <6>, the thickness of the top portions may be 0.50 times to 0.90 times of the thickness of the at least part of the shift portion.

<8> In the fuel cell separator described in <6> or <7>, the fiber sheet may include at least either of carbon fibers and resin fibers each having a fiber diameter of 1 μm to 100 μm and a fiber length of 1 mm to 30 mm.

<9> In the fuel cell separator described in any one of <6> to <8>, the resin may include at least either of thermosetting resin and thermoplastic resin.

In this disclosure, at the time when the material sheet obtained by applying the carbon particles and the resin to the fiber sheet is pressed into a recess-projection shape, the draft of the top portions is made higher than the draft of the shift portion. This makes it possible to provide the manufacturing method for manufacturing the fuel cell separator the conductivity of which is improved more than before while the strength of the fuel cell separator is maintained. Further, in the manufacturing method according to this disclosure, the content ratio of the carbon particles in the top portion, of the recess-projection shape, that largely affects the conductivity is increased, while the content ratio of the resin in the shift portion is increased. This makes it possible to provide the fuel cell separator the conductivity of which is improved more than before while the strength of the fuel cell separator is maintained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes embodiments of a fuel cell separator and a manufacturing method thereof according to this disclosure in detail. Note that the following embodiment is not intended to limit the fuel cell separator and the manufacturing method thereof according to this disclosure.

A carbon-material based fuel cell separator contains resin for securing strength as a formed body, in addition to a carbon material for securing conductivity. Generally, the resin has a low conductivity, and therefore, the resin decreases the conductivity of the fuel cell separator. In order to improve the conductivity, it is conceivable that the content ratio of the resin is decreased. However, in this case, it is difficult to maintain strength as a formed body.

The fuel cell separator (hereinafter also referred to as a "separator") has a recess-projection shape (a corrugated shape). By combining two separators having such a recess-projection shape, passages through which fuel gas and oxidation gas (hereinafter also referred to as "reactant gas") flow and a coolant passage are formed. In order to reduce the internal resistance of a fuel cell, it is necessary to improve electrical contact between adjacent separators and electrical contact with an adjacent membrane electrode gas diffusion layer assembly (hereinafter, those contacts may be referred to as "electrical contact between adjacent separators, and so on"). However, even in a case where the conductivity of the whole part of the separator is not increased, when the conductivity of top portions of the recess-projection shape is increased, it is possible to sufficiently improve the electrical contact between adjacent separators, and so on. In the meantime, even when the conductivity of a shift portion (a vertical wall portion) via which the top portions in the recess-projection shape are connected to each other decreases to some extent, this does not affect the electrical contact between adjacent separators, and so on so much. That is, when the conductivity is increased in the top portion rather than in the shift portion, it is possible to sufficiently improve the electrical contact between adjacent separators, and so on. In order to achieve this improvement, the inventors of the present disclosure found the following fact. That is, the content ratio of the carbon material should be made higher in the top portion than in the shift portion. As a result, the content ratio of the resin in the top portion decreases, and therefore, the strength of the top portion decreases. However, the content ratio of the resin in the shift portion increases, and therefore, the strength of the shift portion increases. As a result, it is possible to secure the strength of the whole separator.

The carbon-material based fuel cell separator is a formed body made of a mixture of the carbon material and the resin. Accordingly, in order to change the content ratio of the carbon material in the top portion and in the shift portion (in order to change the content ratio of the resin), complicated steps are required.

However, the inventors of the present disclosure found that the following method could relatively easily increase the content ratio of the carbon material in the top portion and relatively easily increase the content ratio of the resin in the shift portion.

In order to form a gas circulation passage, a material sheet obtained by applying carbon particles and resin to a fiber sheet is pressed in a recess-projection shape. At this time, when the draft of the top portion is made higher than the draft of the shift portion, most of the resin in the top portion flows to the shift portion while most of the carbon particles in the top portion just remain in the top portion. As a result, the content ratio of the carbon particles in the top portion can be increased, while the content ratio of the resin in the shift portion can be increased. Although not restricted by the theory, this is presumably because the resin has a better fluidity than the carbon particles, and therefore, the resin is easily pushed out from a high-pressure part to a low-pressure part at the time of press, while the carbon particles easily stay at the same position by being restricted by the fiber sheet.

In the meantime, the inventors of the present disclosure found the following fact. That is, in a case where fiber is not formed in a sheet (fiber sheet) shape, and the fiber, carbon particles, and resin are just dispersed in a material sheet, the fiber, the carbon particles, and the resin are pushed out from a high-pressure part to a low-pressure part at substantially the same ratios. As a result, it is difficult to change respective content ratios of the fiber, the carbon particles, and the resin in the high-pressure part and in the low-pressure part.

Next will be described constituent features of the fuel cell separator and the manufacturing method thereof according to this disclosure that were accomplished based on the above knowledge and so on.

Fuel Cell Separator

Figure 1:
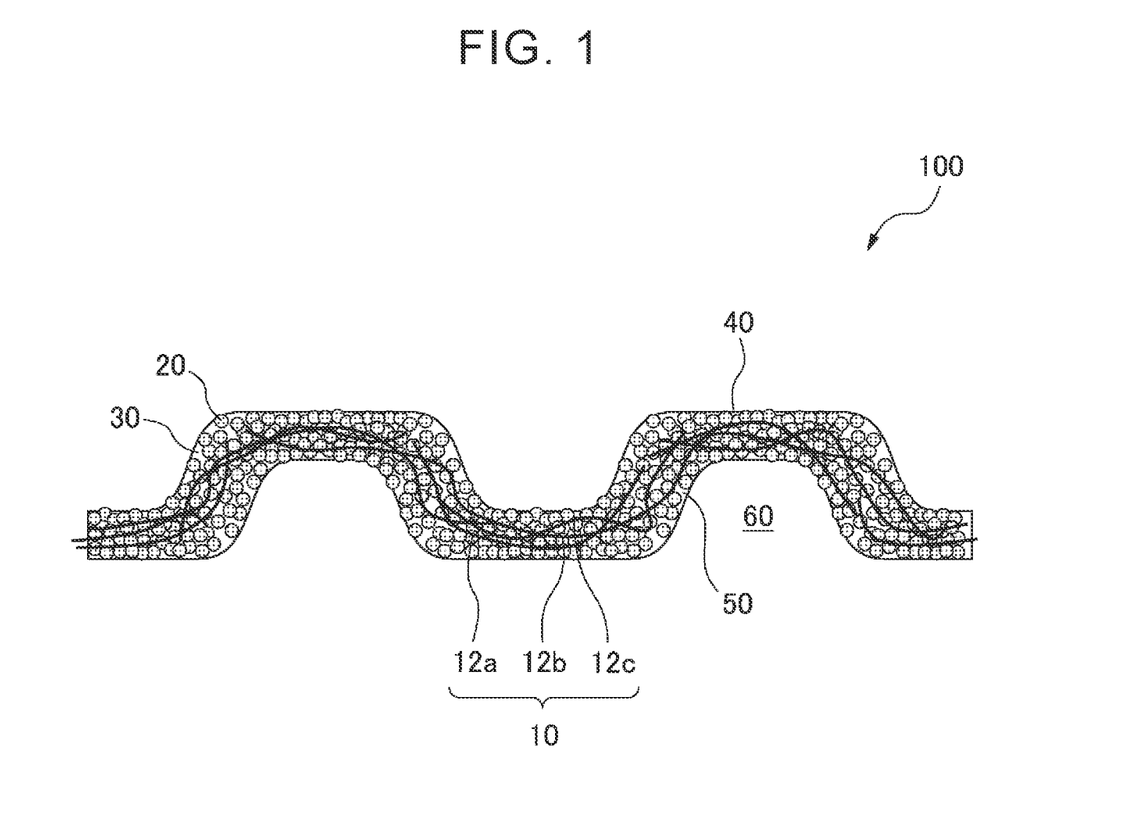
FIG. 1 is a sectional schematic view illustrating an example of a fuel cell separator according to this disclosure.

The fuel cell separator according to this disclosure will be described with reference to the drawings. FIG. 1 is a sectional schematic view illustrating an example of the fuel cell separator according to this disclosure.

As illustrated in FIG. 1, the fuel cell separator 100 according to this disclosure includes a fiber sheet 10, carbon particles 20, and a resin 30. Further, the fuel cell separator 100 according to this disclosure has a recess-projection shape and includes top portions 40 and shift portions 50. The following describes the fiber sheet 10, the carbon particles 20, and the resin 30. The following also describes the recess-projection shape, the top portion 40, and the shift portion 50.

Fiber Sheet

The fiber sheet 10 includes fibers 12a, 12b, 12c. Herein, for illustrative purposes, the fiber sheet 10 includes three fibers 12a, 12b, 12c, but in practice, the fiber sheet 10 is constituted by many fibers.

In the fiber sheet 10, the carbon particles 20 and the resin 30 are dispersed. The fiber sheet 10 is not limited in particular, provided that the carbon particles 20 and the resin 30 can be dispersed in the fiber sheet 10. Examples of the fiber sheet 10 include a carbon fiber sheet, a resin fiber sheet, an inorganic fiber sheet, and so on. These sheets may be used in combination. The conductivity of the fuel cell separator is mainly expressed by the carbon particles 20 in the fiber sheet 10. When the fiber sheet 10 is a carbon fiber sheet, the carbon fiber sheet also contributes to improvement in the conductivity of the fuel cell separator. In view of this, it is preferable to use the carbon fiber sheet as the fiber sheet 10.

Examples of the carbon fiber sheet include pitch-based carbon fiber sheets obtained from heavy gravity oil, by product oil, and coal tar, a PAN-based carbon fiber sheet obtained from polyacrylonitrile, and so on. These sheets may be used in combination. As the carbon fiber sheet, a sheet obtained by forming vapor grown carbon fibers into a sheet shape or a sheet obtained by forming carbon nanotubes into a sheet shape can be used. As the diameter and length (fiber diameter and fiber length) of fibers constituting the carbon fiber sheet are larger, the capture ability to capture the carbon particles when the material sheet is pressed is higher. In this regard, as the carbon fiber sheet, a pitch-based carbon fiber sheet and a PAN-based carbon fiber sheet both having a large fiber diameter and a large fiber length are preferable. The diameter and length (fiber diameter and fiber length) of fibers in the fiber sheet will be described later.

Examples of the resin fiber sheet include fiber sheets made of polyamide, polyphenyl sulfon, polypropylene, polycarbonate, poly ether ether ketone, polyamideimide, polyphenylene sulfide, polyetherimide, poly(ether ether ketone ketone), and so on. These sheets may be used in combination. From the viewpoint of improving the strength of the fuel cell separator, fiber sheets made of polyamide, polypropylene, polycarbonate, and polyetherimide are preferable.

Examples of the inorganic fiber sheet include a glass fiber sheet, a ceramic fiber sheet, a rockwool sheet, and so on. These sheets may be used in combination.

Respective fiber diameters of the fibers 12a, 12b, 12c constituting the fiber sheet 10 may be, for example, 1 µm or more, 3 µm or more, 7 µm or more, 10 µm or more, 20 µm or more, 30 µm or more, or 40 µm or more and may be 100 µm or less, 90 µm or less, 80 µm or less, 70 µm or less, 60 µm or less, or 50 µm or less. Further, respective fiber lengths of the fibers 12a, 12b, 12c may be 1 mm or more, 3 mm or more, 5 mm or more, 7 mm or more, or 10 mm or more and may be 30 mm or less, 25 mm or less, 20 mm or less, or 15 mm or less. When the fiber diameters and the fiber lengths are set in the above ranges, the capture ability to capture the carbon particles when the material sheet is pressed is improved.

The form of the fiber sheet 10 is not limited in particular, provided that the carbon particles 20 and the resin 30 can be carried. Examples of the fiber sheet 10 include the form of a nonwoven fabric, the form of a web sheet, the form of a mesh sheet, and so on. These forms may be used in combination.

Carbon Particles

As illustrated in FIG. 1, the carbon particles 20 are dispersed in the fiber sheet 10 together with the resin 30. The carbon particles 20 and the resin 30 are carried by the fiber sheet 10. The resin 30 will be described later.

The carbon particles 20 secure the conductivity of the fuel cell separator 100. The type of the carbon particles 20 is not limited in particular, provided that the conductivity can be secured. Further, in FIG. 1, the carbon particles 20 have a spherical shape, but they are just illustrated schematically. The shape of the carbon particles 20 is not limited in particular, provided that the carbon particles 20 can be carried by the fiber sheet 10 together with the resin 30. For example, the carbon particles 20 may be particles made of carbon fibers having a short fiber diameter and a short fiber length.

Examples of the carbon particles 20 include particles made of carbon black, expanded graphite, artificial graphite, natural graphite, kish graphite, carbon fibers, vapor grown carbon fibers, and so on. These particles may be used in combination.

The particle diameter of the carbon particles 20 is not limited in particular, provided that the carbon particles 20 can be carried by the fiber sheet 10 together with the resin 30. The particle diameter of the carbon particles 20, for example, may be 5 µm or more, 10 µm or more, 15 µm or more, 20 µm or more, 25 µm or more, 30 µm or more and may be 100 µm or less, 90 µm or less, 80 µm or less, 70 µm or less, 60 µm or less, 50 µm or less, or 40 µm or less. Note that, in the present specification, the particle diameter of the carbon particles is 50% cumulative diameter (d50-diameter) by a laser optical diffraction method unless otherwise specified.

Resin

As illustrated in FIG. 1, the resin 30 is dispersed in the fiber sheet 10 together with the carbon particles 20. The carbon particles 20 and the resin 30 are carried by the fiber sheet 10.

The type of the resin 30 is not limited in particular, provided that the resin 30 can be carried by the fiber sheet 10 together with the carbon particles 20. Examples of the resin 30 include thermosetting resin, thermoplastic resin, and so on. These resins may be used in combination. From the viewpoint of more easily manufacturing the fuel cell separator and from the viewpoint that the resin easily flows to a low-pressure part at the time of pressing the material sheet (from the viewpoint of fluidity at the time of press), the thermosetting resin is preferable. A manufacturing method for manufacturing the fuel cell separator will be described later.

Examples of the thermosetting resin include epoxy resin, polyimide resin, novolac-based phenolic resin, resol-based phenolic resin, and so on. These resins may be used in combination. From the viewpoint of the strength of the fuel cell separator, epoxy resin is preferable.

Examples of the thermoplastic resin include polypropylene, polyethylene, polybutene, polymethylpentene, syndiotactic polystyrene, acrylonitrile-butadiene-styrene copolymer, polystyrene, acryl resin, polyvinyl chloride, polyimide, liquid crystalline polymer, poly ether ether ketone, fluororesin, polyolefin, polyacetal, polyamide, polyethylene terephthalate, polybutylene terephthalate, polycarbonate, poly cycloolefin, polyphenylene sulfide, polyether sulfone, polyphenylene oxide, poly phenylene sulfone, and so on. These resins may be used in combination.

Recess-Projection Shape

Figure 2:
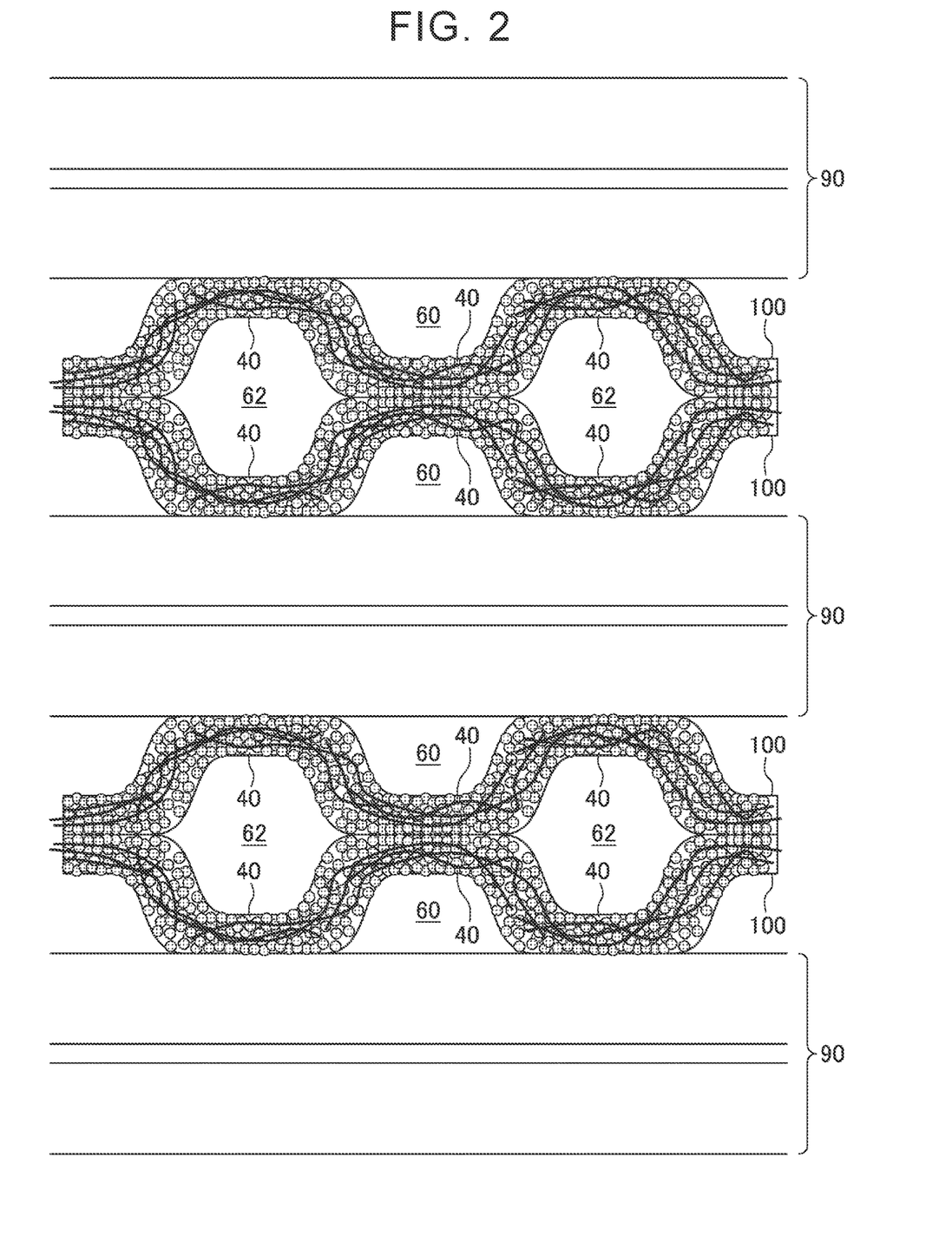
FIG. 2 is an essential-part sectional schematic view illustrating an example of a fuel cell using the fuel cell separator according to this disclosure.

As illustrated in FIG. 1, the fuel cell separator 100 has a recess-projection shape on both surfaces. In a case of a solid polymer fuel cell, generally, two fuel cell separators 100 are used in combination, and a fuel cell is formed by sandwiching the two fuel separators 100 by membrane-electrode gas diffusion layer assemblies (MEGA). FIG. 2 is an essential-part sectional schematic view illustrating an example of a fuel cell using the fuel cell separator according to this disclosure. As illustrated in FIG. 2, the two fuel cell separator 100 are sandwiched between the membrane-electrode gas diffusion layer assemblies 90, so that gas circulation passages 60 are formed by the fuel cell separators 100 and the membrane-electrode gas diffusion layer assemblies 90. Further, coolant passages 62 are formed by the two fuel cell separators 100. In FIG. 2, by increasing the conductivity of the top portions 40 where the two fuel cell separators 100 make contact with each other, the electrical contact between the two fuel cell separators, and so on are improved.

Top Portion and Shift Portion

The recess-projection shape of the fuel cell separator 100 includes the top portions 40 and the shift portions 50 via each of which the top portions 40 adjacent to each other are connected to each other. The thickness of the top portion 40 is thinner than the thickness of at least part of the shift portion 50. The thickness indicates the shortest length from a specific point on a first surface to a second surface and, generally, the length in the normal direction. Further, in the fuel cell separator 100 according to this disclosure, the content ratio of the carbon particles 20 is higher in at least part of the top portion 40 than in at least part of the shift portion 50. By increasing the content ratio of the carbon particles 20 in the top portion 40 that largely affects the conductivity, the conductivity of the whole fuel cell separator 100 can be increased. The area content ratio of the carbon particles 20 in at least part of the top portion 40, for example, may be 1.1 times or more, 1.3 times or more, 1.5 times or more, 1.7 times or more, or 2.0 times or more of the area content ratio of the carbon particles 20 in at least part of the shift portion 50 and also may be 5.0 times or less, 4.5 times or less, 4.0 times or less, 3.5 times or less, 3.0 times or less, 2.7 times or less, 2.5 times or less, or 2.2 times or less of the content ratio of the carbon particles 20 per area in at least part of the shift portion 50. In this disclosure, the "area content ratio" of the carbon particles 20 can be measured by observing a section of the fuel cell separator 100 according to this disclosure by a scanning electron microscope (SEM) or the like. The area content ratio of the carbon particles 20 will be described later.

Figure 3A:
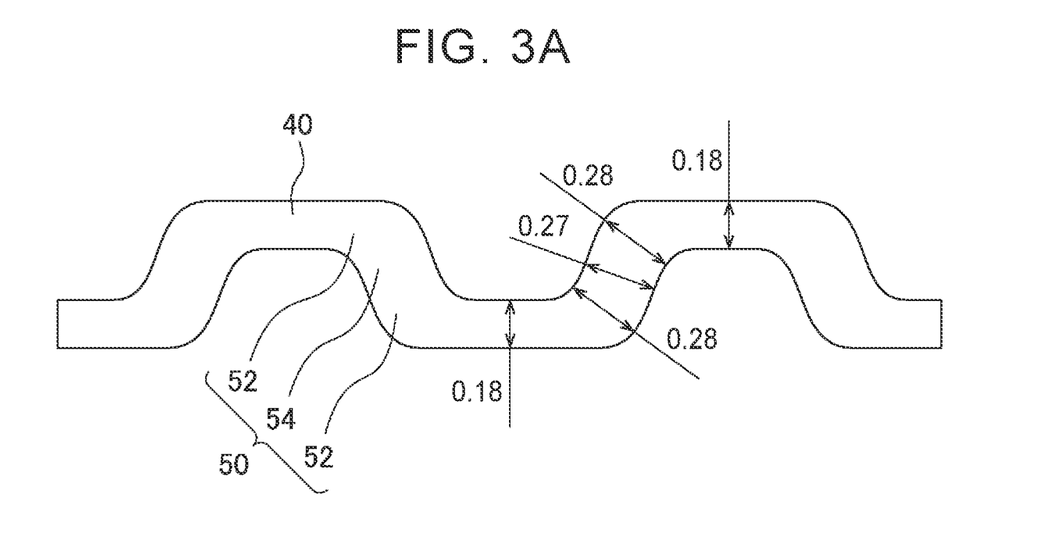
FIG. 3A is a sectional schematic view illustrating an example of a top portion and a shift portion in the fuel cell separator according to this disclosure.
Figure 3B:
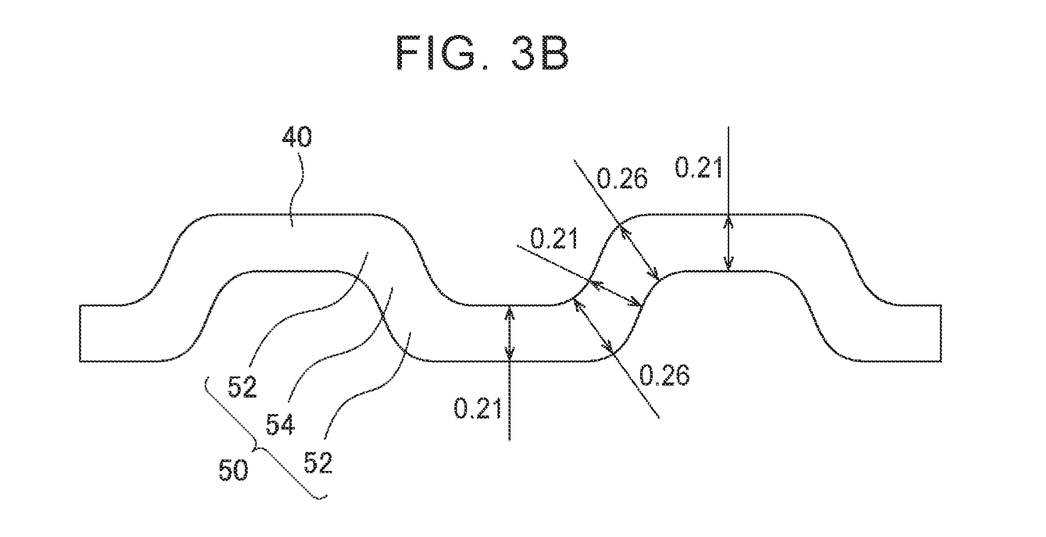
FIG. 3B is a sectional schematic view illustrating another example of the top portion and the shift portion of the fuel cell separator according to this disclosure.

FIG. 3A is a sectional schematic view illustrating an example of the top portion and the shift portion in the fuel cell separator according to this disclosure. FIG. 3B is a sectional schematic view illustrating another example of the top portion and the shift portion of the fuel cell separator according to this disclosure. The thickness of the top portion 40 is not limited to the examples illustrated in FIGS. 3A, 3B, provided that the thickness of the top portion 40 is thinner than the thickness of at least part of the shift portion 50. Further, concrete values (unit: mm) of thicknesses illustrated in FIGS. 3A, 3B are just examples to make the following description clear, and the thicknesses are not limited to these values.

FIG. 3A is a sectional schematic view illustrating a model example of the top portion 40 and the shift portion 50 of the fuel cell separator 100 according to this disclosure. The shift portion 50 includes a bending portion 52 via which the top portion 40 is connected to the shift portion 50 and an intermediate portion 54 via which adjacent bending portions 52 are connected to each other. In FIG. 3B, the shift portion 50 also includes the bending portion 52 and the intermediate portion 54. In the example illustrated in FIG. 3A, the thickness of the top portion 40 is thinner than respective thicknesses of the bending portion 52 and the intermediate portion 54. Hereby, the content ratio of the carbon particles 20 is higher in the top portion 40 than in both the bending portion 52 and the intermediate portion 54, and as a result, the conductivity of the whole fuel cell separator 100 is increased. Further, the content ratio of the resin 30 is higher in both the bending portion 52 and the intermediate portion 54 than in the top portion 40, so that the strength of the whole fuel cell separator 100 can be maintained.

FIG. 3B is a sectional schematic view illustrating another example of the top portion 40 and the shift portion 50 of the fuel cell separator 100 according to this disclosure. In the example illustrated in FIG. 3B, the thickness of the top portion 40 is thinner than the thickness of the bending portion 52 in the shift portion 50. Hereby, the content ratio of the carbon particles 20 is higher in the top portion 40 than in the bending portion 52, and as a result, the conductivity of the whole fuel cell separator 100 is increased. Further, the content ratio of the resin 30 is higher in the bending portion 52 than in the top portion 40, so that the strength of the whole fuel cell separator 100 can be maintained.

In the example illustrated in FIG. 3B, the thickness (0.21 mm) of the top portion 40 is thinner than the thickness (0.26 mm) of the bending portion 52 that is part of the shift portion 50, and the thicknesses (0.21 mm) of the intermediate portion 54 is the same as the thickness of the top portion 40. However, the fuel cell separator according to this disclosure is not limited to this. For example, the thickness (0.21 mm) of the top portion 40 may be thinner than the thickness (0.26 mm) of the intermediate portion 54 that is part of the shift portion 50, and the thicknesses (0.21 mm) of the bending portion 52 may be the same as the thickness of the top portion 40.

The thickness of the top portion 40 should be thinner than the thickness of at least part of the shift portion 50. For example, the thickness of the top portion 40 may be 0.50 times or more or 0.55 times or more of the thickness of at least part of the shift portion 50 and may be 0.90 times or less, 0.80 times or less, 0.70 times or less, 0.65 times or less, or 0.60 times or less of the thickness of the at least part of the shift portion 50.

Figure 4A:
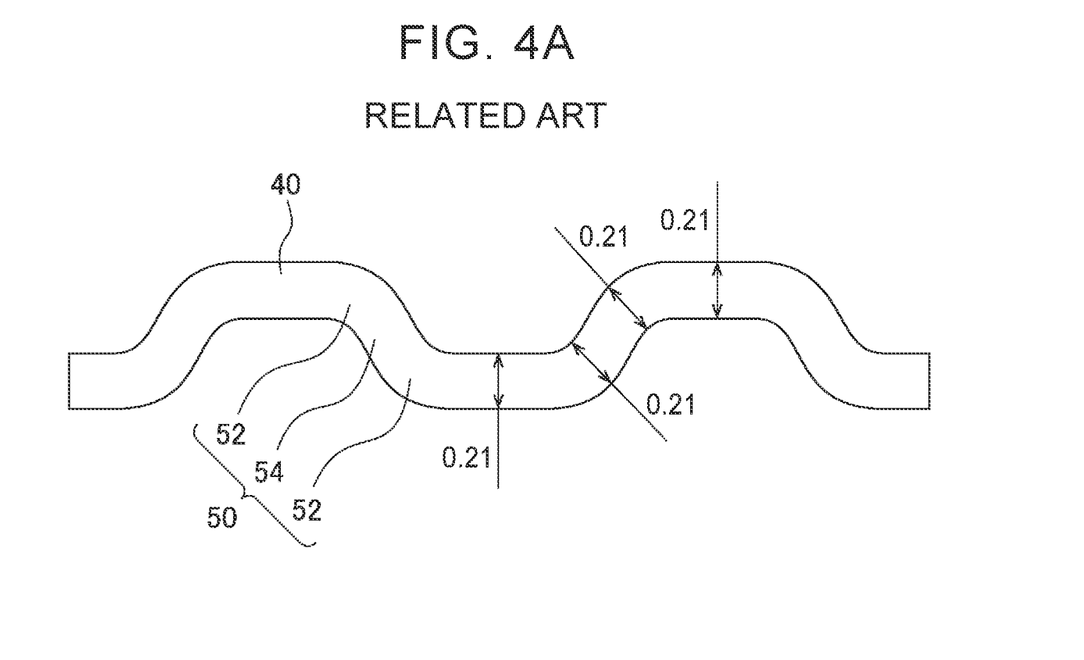
FIG. 4A is a sectional schematic view illustrating part of a first example of a fuel cell separator in the related art.
Figure 4B:
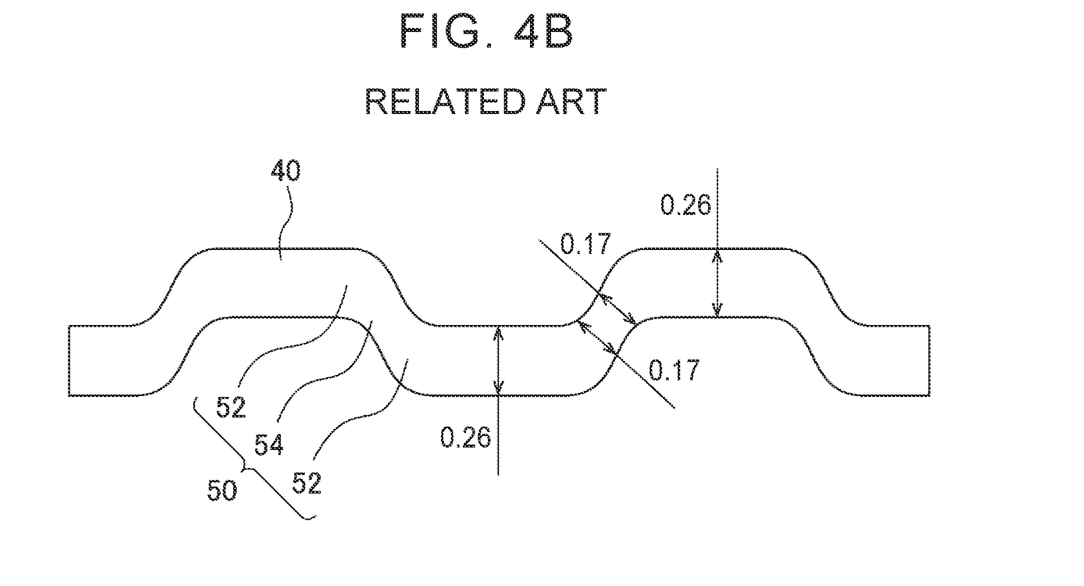
FIG. 4B is a sectional schematic view illustrating part of a second example of the fuel cell separator in the related art.
Figure 4C:
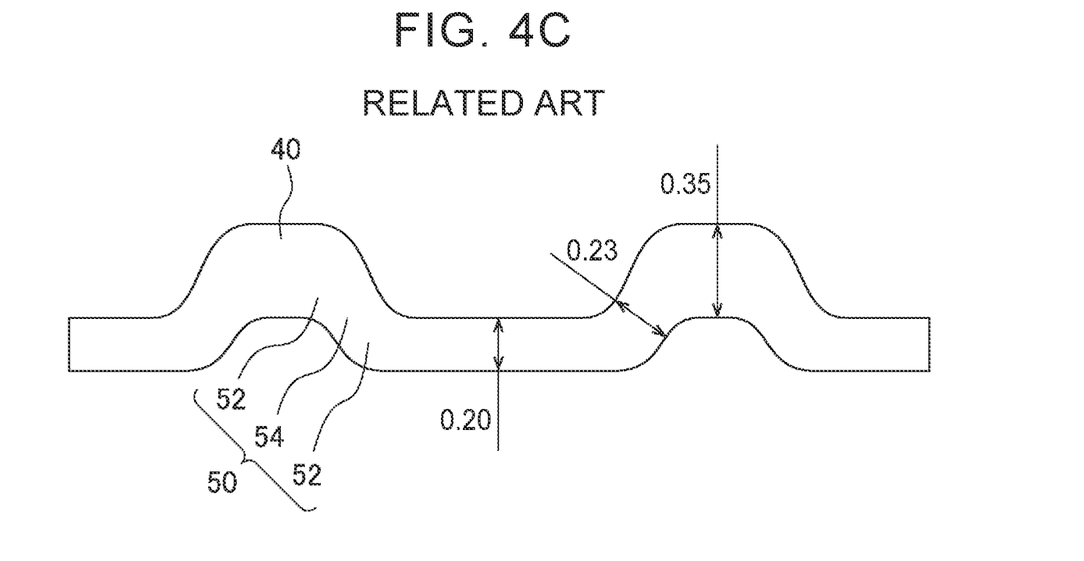
FIG. 4C is a sectional schematic view illustrating part of a third example of the fuel cell separator in the related art.
Figure 4D:
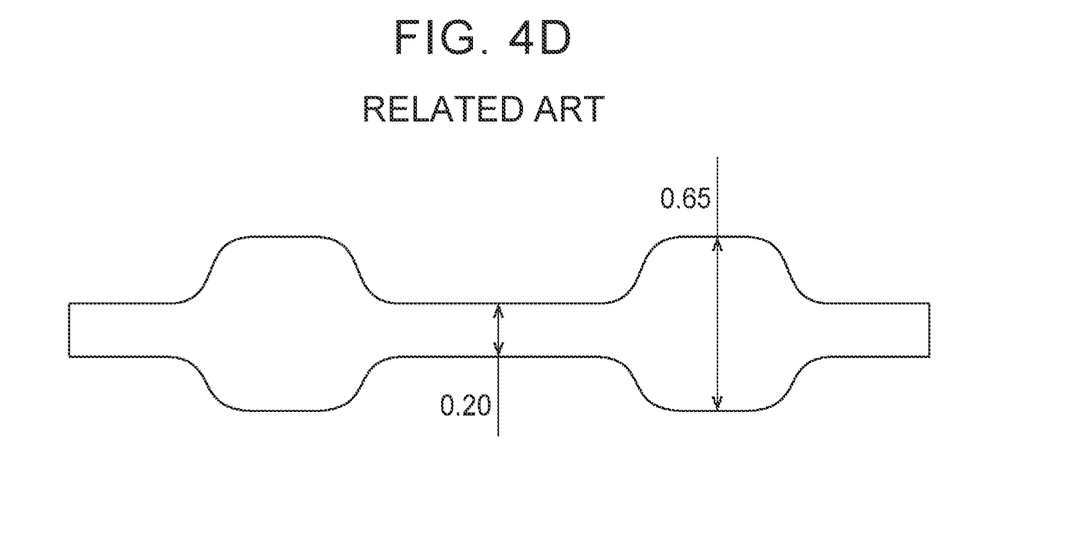
FIG. 4D is a sectional schematic view illustrating part of a fourth example of the fuel cell separator in the related art.

As illustrated in FIGS. 4A to 4D, fuel cell separators in the related art are configured such that the thickness of the top portions 40 on both surfaces is not thinner than the thickness of at least part of the shift portion 50, and therefore, the effect of the fuel cell separator 100 according to this disclosure cannot be obtained. FIG. 4A is a sectional schematic view illustrating part of a first example of the fuel cell separator in the related art. FIG. 4B is a sectional schematic view illustrating part of a second example of the fuel cell separator in the related art. FIG. 4C is a sectional schematic view illustrating part of a third example of the fuel cell separator in the related art. FIG. 4D is a sectional schematic view illustrating part of a fourth example of the fuel cell separator in the related art.

In the first example illustrated in FIG. 4A, the thickness of the top portion 40 and the thickness of the shift portion 50 are the same. In the second example illustrated in FIG. 4B, respective thicknesses of all the top portions 40 are thicker than the thickness of the shift portion 50. In the third example illustrated in FIG. 4C, the thickness of the top portion 40 on a first surface (the top portion 40 projecting upward among the top portions 40 illustrated in FIG. 4C) is thicker than the thickness of the shift portion 50, and thus, both of the thicknesses of the top portions 40 on opposite surfaces (the top portion 40 projecting upward and the top portion 40 projecting downward) are not thinner than the shift portion 50. In the fourth example illustrated in FIG. 4D, the top portions on the opposite surfaces overlap each other, so that the thickness of a part where they overlap each other is thicker than the other parts.

Manufacturing Method

A manufacturing method for manufacturing the fuel cell separator according to this disclosure includes a material sheet providing step and a press step. The following describes each step.

Material Sheet Providing Step

Figure 5:
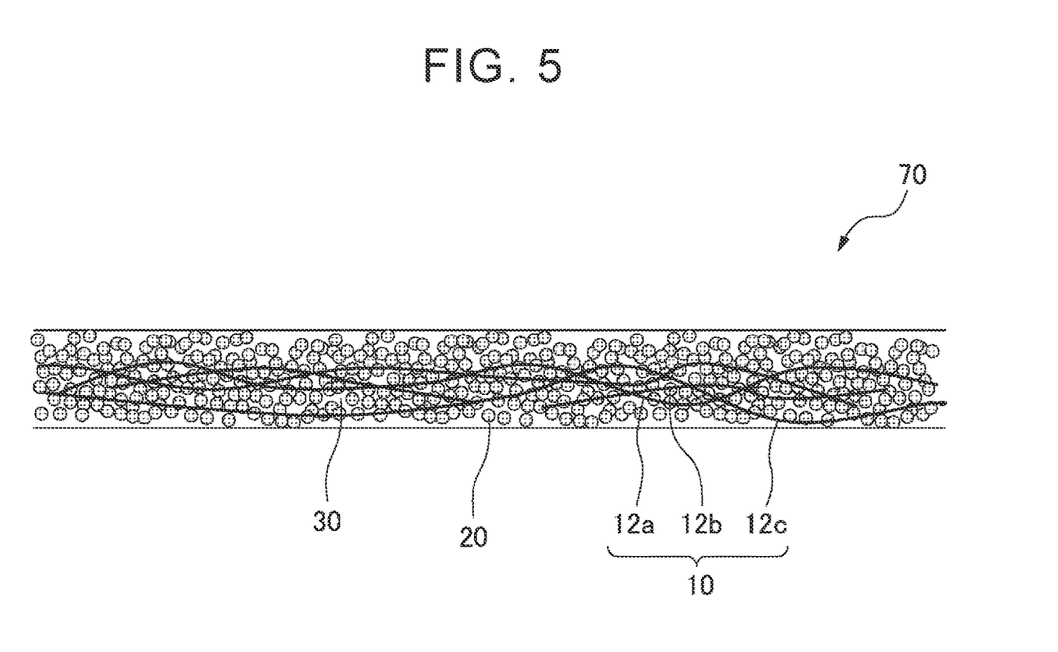
FIG. 5 is a sectional schematic view illustrating an example of a material sheet used in a manufacturing method for manufacturing a fuel cell separator according to this disclosure.

In the manufacturing method for manufacturing the fuel cell separator according to this disclosure, a material sheet is first provided. FIG. 5 is a sectional schematic view illustrating an example of the material sheet used in the manufacturing method for manufacturing the fuel cell separator according to this disclosure (hereinafter also just referred to as the "manufacturing method according to this disclosure").

As illustrated in FIG. 5, the material sheet 70 includes the fiber sheet 10, and the carbon particles 20 and the resin 30 applied to the fiber sheet 10. The carbon particles 20 and the resin 30 applied to the fiber sheet 10 indicate a state where the carbon particles 20 and the resin 30 are carried by the fiber sheet 10 after the material sheet 70 is pressed in the subsequent press step.

The fiber sheet 10, the carbon particles 20, and the resin 30 are as described in "Fuel Cell Separator."

How to provide the material sheet 70 by applying the carbon particles 20 and the resin 30 to the fiber sheet 10 is not limited in particular. In a case where the resin 30 is thermosetting resin, the fiber sheet 10 is impregnated with the carbon particles 20 and the resin 30, for example. As a typical impregnation method, there is such a method that a solution in which the carbon particles 20 are mixed with the resin 30 is applied onto a surface of the fiber sheet 10 with an applicator, for example, so that the fiber sheet 10 is impregnated with the carbon particles 20 and the resin 30. Alternatively, there is such a method that the fiber sheet 10 is immersed in a solution in which the carbon particles 20 are mixed with the resin 30, so that the fiber sheet 10 is impregnated with the carbon particles 20 and the resin 30. In either case of the application and the immersion, a solvent may be further added to the solution in which the carbon particles 20 are mixed with the resin 30, so as to improve an impregnation property.

In a case where the resin 30 is thermoplastic resin, the fiber sheet 10 impregnated with the carbon particles 20 may be sandwiched between thermoplastic resin sheets containing the carbon particles 20, and a resultant sheet may be used as the material sheet 70, for example. At the time when the fiber sheet 10 is impregnated with the carbon particles 20, a solvent (binder) may be added to the carbon particles 20, and the fiber sheet 10 may be impregnated with a resultant mixture. The thermoplastic resin sheet containing the carbon particles 20 may be obtained by molding a mixture of the carbon particles 20 and thermoplastic resin (the resin 30) into a sheet shape.

Respective content ratios of the fiber sheet 10, the carbon particles 20, and the resin 30 to the whole material sheet should be determined in consideration of various conditions appropriately. Examples of the various conditions include types of the fiber sheet 10, the carbon particles 20, and the resin 30, moldability of the material sheet 70 at the time of press, conductivity and strength of the fuel cell separator 100, and so on.

The content ratio of the fiber sheet 10, for example, may be 1% by mass or more, 3% by mass or more, or 5% by mass or more of the whole material sheet 70 and may be 10% by mass or less, 8% by mass or less, or 6% by mass or less of the whole material sheet 70. When the content ratio of the fiber sheet 10 is set as described above, the carbon particles 20 are captured in a high-pressure part at the time when the material sheet 70 is pressed, so that the resin 30 can easily flow from the high-pressure part to a low-pressure part.

The content ratio of the carbon particles 20, for example, may be 50% by mass or more, 60% by mass or more, or 70% by mass or more of the whole material sheet and may be 90% by mass or less, 85% by mass or less, or 80% by mass or less of the whole material sheet. When the content ratio of the carbon particles 20 is set as described above, the conductivity of the whole fuel cell separator 100 can be easily secured.

The content ratio of the resin 30, for example, may be 5% by mass or more, 10% by mass or more, 15% by mass or more, 20% by mass or more, or 25% by mass or more of the whole material sheet 70 and may be 40% by mass or less, 35% by mass or less, or 30% by mass or less of the whole material sheet 70. When the content ratio of the resin 30 is set as described above, the strength of the whole fuel cell separator 100 can be easily secured.

The material sheet 70 can contain a substance other than the fiber sheet 10, the carbon particles 20, and the resin 30 as long as the substance does not substantially adversely affect the effects of the fuel cell separator and the manufacturing method thereof according to this disclosure. Such a substance may be a solvent or the like to be used when the fiber sheet 10 is impregnated with the carbon particles 20 and the resin 30, for example.

Respective content ratios of the fiber sheet 10, the carbon particles 20, and the resin 30 to the whole material sheet 70 are substantially the same as respective content ratios of the fiber sheet 10, the carbon particles 20, and the resin 30 to the whole fuel cell separator 100 after press. The term "to the 'whole' fuel cell separator 100" indicates that, after the material sheet 70 is pressed, the top portion 40 and the shift portion 50 have different content ratios of the carbon particles 20 and the resin 30, but in terms of the whole fuel cell separator 100, the content ratios of the carbon particles 20 and the resin 30 are the same as those to the whole material sheet 70.

The fuel cell separator 100 can contain a substance other than the fiber sheet 10, the carbon particles 20, and the resin 30 as far as the substance does not substantially adversely affect the effects of the fuel cell separator and the manufacturing method thereof according to this disclosure. Such a substance may be a solvent or the like to be used when the fiber sheet 10 is impregnated with the carbon particles 20 and the resin 30, for example.

Press Step

In the press step, the material sheet 70 is pressed to form a gas circulation passage, so that the top portion 40 and the shift portion 50 are obtained. In the press of the material sheet 70, the material sheet 70 is pressed so that the draft of the top portion 40 is higher than the draft of the shift portion 50. Hereby, most of the resin 30 in the top portion 40 flows to the shift portion 50, while most of the carbon particles 20 in the top portion 40 are captured by the fiber sheet 10 and just remain in the top portion 40. As a result, the content ratio of the carbon particles 20 in the top portion 40 can be increased, and the content ratio of the resin 30 in the shift portion 50 can be increased. The content ratio of the carbon particles 20 and the content ratio of the resin 30 can be represented by respective area content ratios of the carbon particles 20 and the resin 30 when the section of the fuel cell separator 100 according to this disclosure is observed by a scanning electron microscope (SEM) or the like. A preferable range of the area content ratio of the carbon particles 20 is as described earlier. In terms of the area content ratio of the resin 30, the area content ratio of the resin 30 in at least part of the shift portion 50, for example, may be 1.1 times or more, 1.3 times or more, 1.5 times or more, 1.7 times or more, or 2.0 times or more of the area content ratio of the resin 30 in at least part of the top portion 40 and may be 5.0 times or less, 4.5 times or less, 4.0 times or less, 3.5 times or less, 3.0 times or less, 2.7 times or less, 2.5 times or less, or 2.2 times or less of the area content ratio of the resin 30 in the at least part of the top portion 40.

The "draft" indicates a percentage of a thickness reduced by press to a thickness before the press. For example, when a fuel cell separator having a thickness of 0.3 mm is obtained by pressing a material sheet having a thickness of 1 mm, the draft of the fuel cell separator is 70%.

In the manufacturing method according to this disclosure, the material sheet 70 is pressed so that the draft of the top portion 40 is higher than the draft of the shift portion 50. Accordingly, in the fuel cell separator 100 after the press, the thickness of the top portion 40 is thinner than the thickness of the shift portion.

The draft of the top portion 40, for example, may be 1.2 times or more, 1.3 times or more, 1.4 times or more, 1.5 times or more, 1.6 times or more, or 1.7 times or more of the draft of the shift portion 50 and may be 2.0 times or less, 1.9 times or less, or 1.8 times or less of the draft of the shift portion 50.

The press method is not limited in particular, provided that the material sheet can be pressed at the drafts described as above. A typical example of the press method is a method in which a material sheet is pressed by hot press by use of a forming die having a cavity formed in the shape of the fuel cell separator.

The material sheet is pressed by hot press by use of the forming die described above at a temperature (a temperature at which the top portion 40 and the shift portion 50 can be obtained) at which the gas circulation passage can be formed, and then, the material sheet is cooled. The "hot" indicates a temperature at which the gas circulation passage can be formed (a temperature at which the top portion 40 and the shift portion 50 can be obtained). In a case where thermosetting resin is used as the resin 30, typically, the material sheet 70 is pressed at a temperature at which the resin hardens, and then, the material sheet 70 is cooled. In a case where thermoplastic resin is used as the resin 30, typically, the material sheet 70 is pressed at a temperature at which the resin softens, and then, the material sheet 70 is cooled. In a case where the thermoplastic resin has a glass-transition temperature, the material sheet 70 is pressed at a temperature equal to or higher than the glass-transition temperature, and then, the material sheet 70 is cooled. The temperature for the press should be determined in accordance with the type of the resin 30 appropriately. The temperature, for example, may be 150° C. or more, 160° C. or more, 170° C. or more, 180° C. or more, or 190° C. or more and may be 300° C. or less, 280° C. or less, 260° C. or less, 250° C. or less, 240° C. or less, 230° C. or less, 220° C. or less, 210° C. or less, or 200° C. or less.

A press time should be determined in consideration of the type of the resin, the draft, and so on appropriately. The press time, for example, may be 10 seconds or more, 30 seconds or more, 50 seconds or more, 70 seconds or more, or 90 seconds or more and may be 200 seconds or less, 180 seconds or less, 160 seconds or less, 140 seconds or less, 120 seconds or less, or 100 seconds or less.

With the configuration described above, the fuel cell separator according to this disclosure can be obtained.

Modifications

In addition to the configurations described so far, the fuel cell separator and the manufacturing method thereof according to this disclosure can be modified variously within what is described in Claims. For example, in the examples illustrated in FIGS. 3A, 3B, the fuel cell separator has a recess-projection shape on both surfaces but may have a recess-projection shape only on one surface.

The following more specifically describes the fuel cell separator and the manufacturing method thereof according to this disclosure with reference to examples and comparative examples. Note that the fuel cell separator and the manufacturing method thereof according to this disclosure are not limited to the conditions used in the following examples.

Preparation of Samples

Samples were prepared in the following manner.

Example 1

As a fiber sheet, a nonwoven fabric made of carbon fibers was prepared. The fiber diameter of the fibers in the nonwoven fabric was 7 μm, and the fiber length of the fibers was 3 mm. Carbon particles and epoxy resin as thermosetting resin were prepared, and a solvent was added to them. A resultant mixture was applied to the nonwoven fabric, so that the nonwoven fabric was impregnated with the mixture. Then, the solvent was dried, so that a material sheet was obtained. The particle diameter of the carbon particles was 30 μm. The thickness of the material sheet was 0.26 mm. Respective content ratios of the nonwoven fabric, the carbon particles, and the epoxy resin to the material sheet were 5% by mass, 70% by mass, and 25% by mass.

The material sheet was put in a pressing machine heated to 190° C. and pressed for 90 seconds by a forming die having a cavity shape illustrated in FIG. 3A. After the press was completed, a fuel cell separator was taken out of the metal die, and thus, a sample of Example 1 was obtained.

Example 2

A sample of Example 2 was prepared similarly to Example 1 except that a PPS resin mesh sheet was used as a fiber sheet instead of the nonwoven fabric made of carbon fibers. The fiber diameter of polyamide resin was 55 μm, and the aperture thereof was 200 μm.

Example 3

As a fiber sheet, a nonwoven fabric made of carbon fibers was prepared. The fiber diameter of the fibers in the nonwoven fabric was 7 μm, the fiber length of the fibers was 3 mm. Carbon particles having a particle diameter of 30 μm was prepared. Polypropylene was prepared as thermoplastic resin.

A mixture of the polypropylene and the carbon particles was shaped into a sheet shape, and thus, a first sheet was obtained. A solvent (binder) was added to the carbon particles, and a resultant mixture was applied to the nonwoven fabric so that the nonwoven fabric was impregnated with a resultant mixture. Thus, a second sheet was obtained. The second seat was sandwiched by the first seat, and thus, a material sheet was obtained.

The material sheet was put in a pressing machine heated to 190° C. and pressed for 90 seconds by a forming die having the cavity shape illustrated in FIG. 3A. After that, a fuel cell separator was taken out of the metal die, and thus, a sample of Example 3 was obtained.

Comparative Example 1

A sample of Comparative Example 1 was prepared similarly to Example 1 except that a forming die having a cavity shape illustrated in FIG. 4C was used.

Evaluation

Surfaces of the samples were subjected to laser cleaning, and resin layers on the surfaces of the sample were peeled off. Each sample after the laser cleaning was sandwiched between gas diffusion layers, and the penetration resistance of the each sample sandwiched between the gas diffusion layers was measured. The penetration resistance indicates the sum of a resistance of the gas diffusion layer, a contact resistance between the fuel cell separator and the gas diffusion layer, and an internal resistance of the fuel cell separator.

Respective penetration resistances of the samples, in Examples 1 to 3, sandwiched between the gas diffusion layers were 30 mΩ·cm² to 40 mΩ·cm². In the meantime, the penetration resistance of the sample, in Comparative Example 1, sandwiched between the gas diffusion layers was 50 mΩ·cm² to 70 mΩ·cm².

As illustrated in FIG. 4C, the sample of Comparative Example 1 is configured such that the thickness of the top portion 40 on the lower side in the figure (the top portion in the center in the figure) is thinner than the thickness of the shift portion 50, but the thickness of the top portions 40 on the upper side in the figure (the top portions 40 on both sides in the figure) is thicker than the thickness of the shift portion 50. On this account, the penetration resistance of the sample in Comparative Example 1 is larger than the penetration resistances of the samples in Examples 1 to 3. When samples having recess-projection shapes illustrated in FIGS. 4A, 4B are manufactured, the thicknesses of all the top portions 40 of these samples are not thinner than the thicknesses of the shift portions 50 thereof. Accordingly, the penetration resistances of these samples are presumably larger than the penetration resistance of the sample in Comparative Example 1. From this point, it can be said that the conductivities of the fuel cell separators obtained by use of the samples of Examples 1 to 3 are improved.

From the result described above, the effects of the fuel cell separator and the manufacturing method thereof according to this disclosure were confirmed.

What is claimed is:

1. A manufacturing method for manufacturing a fuel cell separator, the manufacturing method comprising:
   providing a material sheet including a fiber sheet, carbon particles, and resin, the carbon particles and the resin being applied to the fiber sheet; and
   pressing the material sheet into a recess-projection shape by which a gas circulation passage is to be formed, and forming a top portion and a shift portion, wherein, in the pressing of the material sheet, the material sheet is pressed such that a draft of the top portion is higher than a draft of the shift portion.

2. The manufacturing method according to claim 1, wherein the draft of the top portion is 1.2 to 2.0 times of the draft of the shift portion.

3. The manufacturing method according to claim 1, wherein the fiber sheet includes at least either of carbon fibers and resin fibers each having a fiber diameter of 1 μm to 100 μm and a fiber length of 1 mm to 30 mm.

4. The manufacturing method according to claim 1, wherein the material sheet is provided by impregnating the fiber sheet with the carbon particles and thermosetting resin.

5. The manufacturing method according to claim 1, wherein the material sheet is provided by sandwiching the fiber sheet impregnated with the carbon particles between thermoplastic resin sheets containing carbon particles such that opposite surfaces of the fiber sheet are covered with the thermoplastic resin sheets.

\* \* \* \* \*